United States Patent Office 3,564,397
Patented Feb. 16, 1971

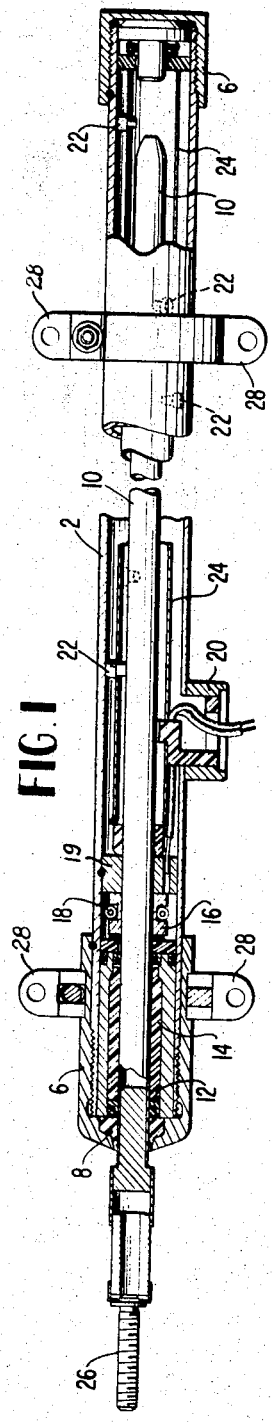
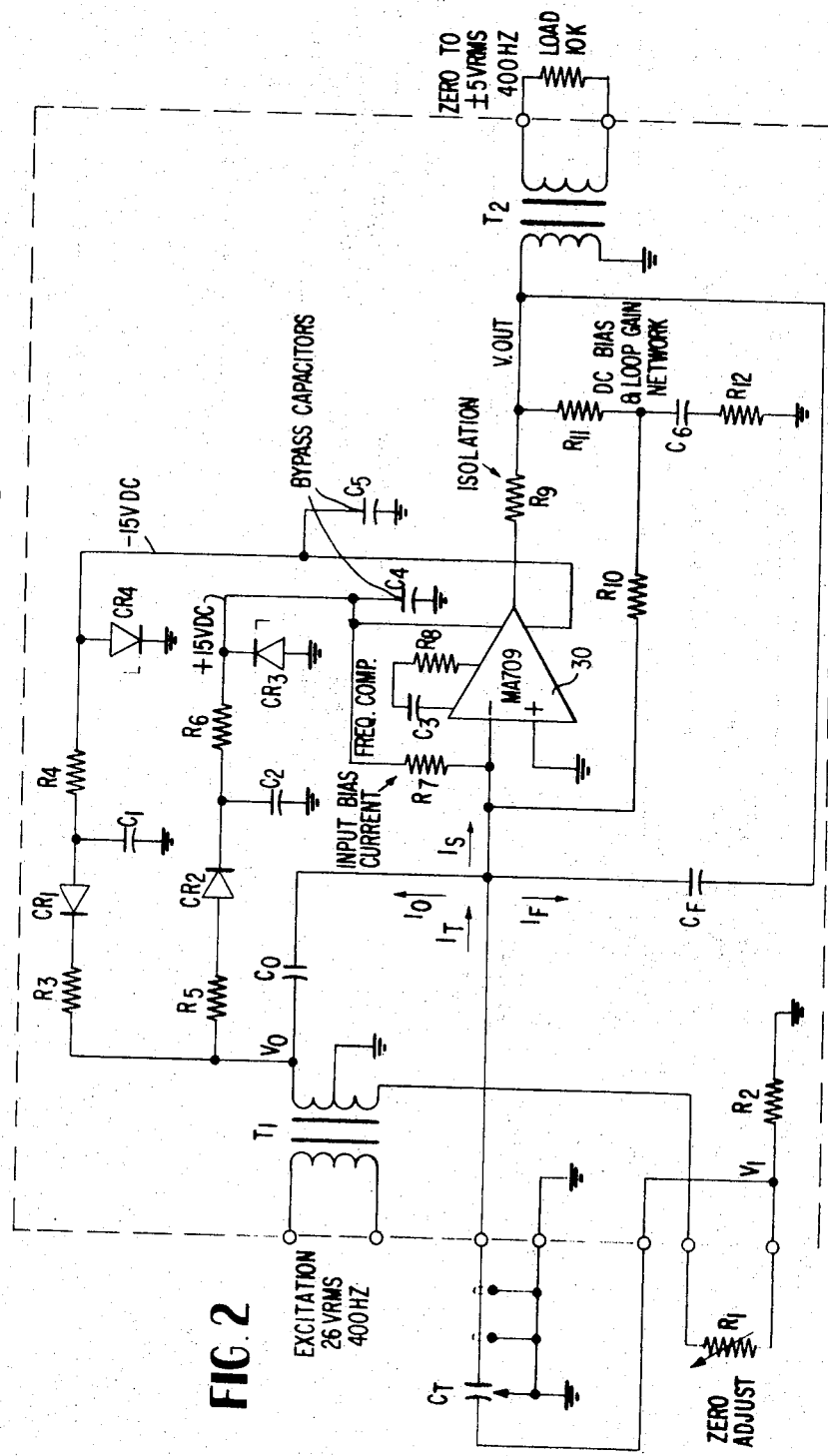

3,564,397
LINEAR VARIABLE CAPACITANCE TRANSDUCER
Raymond W. Sargent, Bristol, and Siderius Van Manen, Vergennes, Vt., assignors to Simmonds Precision Products, Inc., Tarrytown, N.Y.
Continuation-in-part of application, Ser. No. 770,277, Oct. 24, 1968. This application Apr. 24, 1969, Ser. No. 819,012
Int. Cl. G05f 3/00
U.S. Cl. 323—93                           5 Claims

ABSTRACT OF THE DISCLOSURE

A linear variable capacitance transducer having an AC capacitance signal proportional to the linear displacement of a thin-walled metal tube which slides within another metal tube to provide a variable capacitance with the air therebetween as the dielectric.

---

This application is a continuation-in-part of application Ser. No. 770,277, filed Oct. 24, 1968.

This invention relates to a linear variable capacitance transducer employing relatively movable tubular electrode members and, more particularly, to such a transducer having an AC capacitance signal proportional to the linear displacement of one of the sliding tubular members.

There have been proposed a number of variable capacitance transducers in which the plate electrodes are caused to vary their surface area with respect to one another either through movement of the plate members themselves or by varying the amount of dielectric material between the plate members. In a linear variable device it has been proposed to vary the amount of dielectric between the plate members by passing a variable dimensioned tape between the plate members such that the capacitance between the plates depends on the displacement of the tape, the tape having a dimension which varies along its length. In measuring the stroke or linear movement of an object, it has also been proposed to utilize linear variable differential transformers which employ many turns of wire. The purpose of this invention is to provide a linear variable capacitance transducer which is light in weight employing a minimum number of parts and which design can operate under high temperature conditions.

Accordingly, it is an object of this invention to provide a linear variable capacitance transducer for producing a signal in response to displacement of a member and which will be operable under adverse environmental conditions.

It is another object of this invention to provide an improved transducer operative to produce an output signal depending upon the capacitance of the transducer so as to locate the position of an object being monitored.

It is a further object of this invention to provide a linear variable capacitance position transducer that is light in weight, compact in design and which is operable under high temperature conditions and which provides for moisture protection, correction for thermal expansion and which eliminates the possibility of the entrance of dust, dirt or contaminant material within the transducer.

According to one embodiment employing the principles of this invention, there is provided a piston rod tubular member slidable within another metal tubular member, both acting as electrodes, and in which the axial displacement of the sliding rod results in a proportional variation of an AC input signal. The transducer employs an outer structural cylindrical housing having a sealing gland at one end and closed at the opposite end. Within the housing is a stainless steel tubular element mounted concentrically and insulated from the housing which serves as a high impedance member forming one plate of a capacitor. Concentric within this member and electrically insulated from it is the slidable rod member which is maintained at a low impedance potential thus forming the other plate of the capacitor.

Other objects and advantages will become apparent upon a detailed study of the following specification and drawings, in which:

FIG. 1 is a cross-sectional view partially broken illustrating the capacitor transducer in accordance with the principles of this invention; and FIG. 2 is a circuit diagram illustrating the solid state signal conditioner employed with the transducer for providing a conditioned output signal.

Referring now to FIG. 1, there is shown the transducer of the linear variable capacitance type constructed from a metal tubular housing 2 which may be a light weight metal, such as aluminum or the like, and which is threaded at both ends and has a wall thickness sufficient to absorb reasonable bending stresses, rough handling and other operational forces. Internally threaded aluminum caps 6 are provided at each end. One of the end caps includes a scraper ring 8 through which the sliding low impedance tubular rod member 10 passes. The scraper ring provides an efficient dust-removing barrier to prevent the entrance of fine contaminants by incorporating a polyamide-Teflon-high temperature plastic. The self-lubricating properties of the scraper ring are strong enough to remove adhering particles yet soft enough to pass over the reciprocating rod 10 without damaging the surface finish thereof.

Spaced axially from the scraper ring 8 is a spring-loaded Teflon lip seal member 12 between which there is provided an electrically insulating bushing member 14 surrounding the rod 10. Adjacent the innermost lip seal 12 is provided a segmented carbon-graphite bushing 16 with its inner diameter maintained in intimate contact with the rod 10 by means of a garter spring 18. In this manner electrical continuity is maintained throughout the length of the rod 10. A wire lead is electrically connected to the contact bushing 16 via a metal plug 19 surrounding the rod 10 and abutting bushing 16, the end of the lead being inserted in a boring formed in the plug, as shown, and connected thereto by soldering or other known means. The other end of the lead is led out through a plug receptacle member 20 on the housing 2.

Small diameter shouldered spacer members 22 of suitable insulated material are utilized to insulate and mechanically support a high impedance tube 24 which surrounds the low impedance tube 10. The spacers are arranged in a spiral pattern spaced an equal distance from each other as measured along the axis of the transducer.

The slidable rod 10 is constructed of thin-walled stainless steel to match the linear coefficient of thermal expansion of that of the high impedance tube 24. On the outer diameter there is formed a heavy electrodeposition of hard chrome plating. One end of the tubular element 10 is provided with a threaded terminal end 26 which is electrically insulated from the rod proper.

Swing clamps 28 may be provided to support the transducer on a suitable surface. One clamp may be located in a turned diameter on the threaded cap nearest the seal providing a fixed mounting location for the unit. Additional swing clamps may be provided spaced along the cylindrical housing 2 thereby allowing for thermal expansion differences.

FIG. 2 shows a solid state electronic signal conditioner for the output of the variable capacitance transducer. The capacitance transducer is basically a high output impedance device; the electrical output characteristics, however, may be tailored for a specific end by the use of the signal conditioner shown in FIG. 2. This circuit will provide a 0±5 v. RMS output over the stroke with the zero voltage output corresponding to mid stroke of the rod 10. The circuit uses a linear integrated high gain differential amplifier 30 which is operated in the inverting mode to achieve an extremely low closed loop input impedance. The linear capacitance transducer is thus treated as a current source and is essentially unaffected by the transducer shield and by cable capacitance in the shielded leads. Amplifier 30 acts as a current summing amplifier with three basic elements being the transducer current $I_T$ through $C_T$; the zero offset current $I_0$ through $C_0$ and the feedback current $I_F$ through $C_F$. The voltage at the summing point is virtually zero, therefore the current into the amplifier $I_S$ will be:

(A) $\quad V_1 jwC_T - V_0 jwC_0 - V_{out} jwC_F = I_S$ where $V_1$ is the voltage fed to the transducer, $V_0$ the voltage applied to capacitor $C_0$ from the excitation source via transformer $T_1$ (FIG. 2) and $V_{out}$ is the output voltage of the amplifier, which is supplied to the load via an output transformer $T_2$.

The amplifier 30 with its resistive feedback $R_{10}$, $R_{11}$, $R_{12}$, $C_6$ has an input resistance $R_{in}$ and a gain G so that (B) $\quad I_S R_{in} G = V_{out}$ The zero offset capacitor $C_0$ and its voltage $V_0$ are selected so as to equal the product $V_1 \times C_T$ at mid travel of the stroke of the tubular rod 10 and the first two terms of the Equation A become:

(C) $\quad V_1 jw(C_T + \Delta C) - V_1 jwC_T = V_1 jw\Delta C$ where $\Delta C$ is the change in transducer capacitance per unit travel. Combining Equations A, B and C yields, after reduction:

(D) $$V_{out} = \Delta C \frac{V_1 jwR_{in}G}{1 + jwC_F R_{in}G}$$

It will be seen that for $jwC_F R_{in}G \gg 1$, Equation D reduces to:

(E) $$V_{out} = \Delta C \frac{V_1}{C_F}$$

or $V_{out}$ is proportional to $\Delta C$ which in turn is proportional to linear position.

The components $R_{10}$, $R_{11}$, $R_{12}$ and $C_6$ are selected so as to provide a DC bias current, and at the same time reduce the AC input impedance to the desired value. Resistor R1 is used to trim the signal conditioner so as to fulfill the requirement that $V_0 C_0$ cancels the mid travel value of $V_1 C_T$.

The operation of the device is generally as follows. Axial displacement of the transducer sliding tubular rod 10 results in a proportional variation of an AC signal. This signal when properly conditioned by means of the circuit shown in FIG. 2 will result in a voltage directly proportional to the axial displacement of the rod 10. The outer tubular element 24 mounted concentrically and insulated from the housing 2 is the electrical high impedance element forming one plate of the capacitor while the slidable rod 10 concentric within the tubular element 24 is maintained at an electrically low impedance potential, thus forming the other plate of the capacitor. Since capacitance is proportional to surface area, it is evident that maximum capacitance occurs when the rod is fully inserted and conversely minimum capacitance occurs when the rod is fully extended, hence capacitance output is infinitely variable and proportional within these two extremes.

That which is claimed is:

1. A linear variable capacitance transducer for monitoring the axial position of an object comprising, a first metallic hollow tubular rod, a second metallic hollow tubular rod slidingly reciprocal within said first rod but spaced therefrom, said first and second rods forming capacitor plates and means for connecting respectively said first and second rods to an AC signal source for varying the signal output of said source dependent upon the position of said first rod with respect to said second rod, said first and second rods being maintained in their concentric relationship within a tubular housing member and said housing having a contact bushing member for engaging said second rod.

2. A transducer according to claim 1 in which the first rod is maintained at a high impedance and said second rod is maintained at a low impedance.

3. A transducer according to claim 1 wherein the interior of said housing has provided therein supporting spacer members for positioning said first tubular rod within said housing.

4. A transducer according to claim 3, wherein said housing is provided with a sealing means through which said second rod reciprocates to thereby provide a barrier to the entry of foreign matter into said housing.

5. A transducer according to claim 1 further comprising a signal conditioner circuit for said AC signal source for producing a zero signal output at the mid point of the travel of said second tubular rod between two extreme limits of linear movement.

References Cited

UNITED STATES PATENTS

| | | | |
|---|---|---|---|
| 3,002,104 | 9/1961 | Mynall | 323—93X |
| 3,098,183 | 7/1963 | Mitchell | 317—246 |
| 3,181,045 | 4/1965 | Bruntil et al. | 317—249T |
| 3,296,522 | 1/1967 | Wolfendale | 323—93 |
| 3,348,106 | 10/1967 | Vinz | 317—249T |

J D MILLER, Primary Examiner

A. D. PELLINEN, Assistant Examiner

U.S. Cl. X.R.

317—249; 340—200